United States Patent
Lee

(10) Patent No.: US 7,460,522 B2
(45) Date of Patent: Dec. 2, 2008

(54) COMPOSITE VOICE SERVICE TERMINAL APPARATUS, AND METHOD FOR USING THE SAME

(75) Inventor: Chul-Hee Lee, Seongnam (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1246 days.

(21) Appl. No.: 10/613,015

(22) Filed: Jul. 7, 2003

(65) Prior Publication Data
US 2004/0032861 A1    Feb. 19, 2004

(30) Foreign Application Priority Data
Jul. 8, 2002    (KR)    ............... 10-2002-0039384

(51) Int. Cl.
*H04L 12/66* (2006.01)
(52) U.S. Cl. .................. 370/352; 370/356; 370/395.6; 725/114
(58) Field of Classification Search ................. 370/352, 370/356, 395.6; 725/114
See application file for complete search history.

(56) References Cited

U.S. PATENT DOCUMENTS

| | | | |
|---|---|---|---|
| 6,392,999 B1 | 5/2002 | Liu et al. | |
| 6,522,647 B1 | 2/2003 | Czajkowski et al. | |
| 6,535,507 B1 | 3/2003 | Li et al. | |
| 6,560,223 B1 | 5/2003 | Egan et al. | |
| 6,721,282 B2 * | 4/2004 | Motley | ........................ 370/252 |

OTHER PUBLICATIONS

*Voice Over Internet Protocol (VoIP)* by Bur Goode, Proceeding of the IEEE, vol. 90, No. 9, Sep. 2002, pp. 1495-1517.

* cited by examiner

*Primary Examiner*—Gerald Gauthier
(74) *Attorney, Agent, or Firm*—Robert E. Bushnell, Esq.

(57) ABSTRACT

A composite voice service terminal apparatus enables a user or subscriber to selectively use Subscriber Line Interface Circuit/Subscriber Line Audio processing Circuit (SLIC/SLAC), voice digital signal processor (DSP), processor, asymmetric digital subscriber line digital signal processor (ADSL DSP), asymmetric digital subscriber line analog front end (ADSL AFE), multiplexer (MUX) for outputting data to one of the channels from the digital tone generating unit and the voice digital signal processor, digital tone generating unit for including sources of a dial tone, ring back tone, busy tone, and guide tones of voice over Internet protocol (VoIP), voice over digital subscriber line (VoDSL), and voice over multi-service broadband networks (VoMBN), generating a tone corresponding to a selected mode, and transmitting the tone to the Subscriber Line Interface Circuit/Subscriber Line Audio processing Circuit through the multiplexer, and a relay switch to maintain an on state so that the user can use a general phone, and receive an off signal from the processor and interrupt a general phone line when the user has pressed a specific digit for digital network services.

17 Claims, 3 Drawing Sheets

COMPOSITE VOICE SERVICE TERMINAL APPARATUS, AND METHOD FOR USING THE SAME

This application claims priority to an application entitled COMPOSITE VOICE SERVICE TERMINAL APPARATUS, AND METHOD FOR USING THE SAME, filed in the Korean Intellectual Property Office on Jul. 8, 2002 and assigned Serial No. 2002-39384, the contents of which are hereby incorporated by reference.

BACKGROUND OF THE INVENTION

1. Technical Field

The present invention relates to a voice service using a digital network, and, more particularly, to a composite voice service terminal apparatus allowing a user to use a voice call with various service functions all on one terminal, and a method for using the same, with the service functions including general phone, voice over Internet protocol, voice over digital subscriber line, and voice over multi-service broadband networks.

2. Related Art

As a number of users using Internet phones increases, a variety of Internet phones have been developed. One Internet phone performs a voice call through a leased line. The voice over Internet protocol (VoIP) could be developed to attempt to provide the Internet phone at a low price. Unfortunately, the VoIP requires a terminal solely dedicated to VoIP.

The voice over digital subscriber line (VoDSL) could be developed to attempt to improve call quality and reduce call charges. Unfortunately, the VoDSL requires a terminal solely dedicated to VoDSL.

The voice over multi-service broadband networks (VoMBN) could be developed to attempt to provide a voice call service by accessing a general phone and an Internet protocol (IP)/asynchronous transfer mode (ATM)/exchange, in order to attempt to improve call quality and reduce call charges. Unfortunately, the VoMBN requires a terminal solely dedicated to VoMBN.

Exemplars of recent efforts in digital communications are disclosed, for example, in U.S. Pat. No. 6,392,999 to Liu et al. entitled CONFERENCING AND ANNOUNCEMENT GENERATIONFOR WIRELESS VOIP AND VOATM CALLS, issued on May 21, 2002; U.S. Pat. No. 6,535,507 to Li et al., entitled METHOD OF ADDRESS RESOLUTION FOR THE TRANSFER OF SYNCHRONOUS TRANSFER MODE CALLS THROUGH MULTIPLE DOMAINS IN A BROADBAND DATA NETWORK, issued on Mar. 18, 2003; U.S. Pat. No. 6,522,647 to Czajkowski et al., entitled ENHANCED VODSL SERVICE PROVISION, issued on Feb. 18, 2003; and U.S. Pat. No. 6,560,223 to Egan et al., entitled WIRELESS MULTI-SITE NETWORKING USING SIGNALING AND VOICE-OVER-IP, issued on May 6, 2003, an article entitled VOICE OVER INTERNET PROTOCOL (VoIP) by Bur Goode, Proceedings of the IEEE, Vol. 90, No. 9, September 2000, pp. 1495-1517.

While these contemporary efforts contain merit, it is my observation that further improvements can also be contemplated. In particular, it would be advantageous if a method and a single terminal were developed that could handle general telephone communications as well as VoIP, VoDSL, and VoMBN.

SUMMARY OF THE INVENTION

The present invention provides a composite voice service terminal apparatus which includes a variety of voice (call) service functions to enable a user (subscriber) to selectively use the services on his/her call purpose, and a method for using the same.

The present invention provides a composite voice service terminal apparatus including: a converting unit for performing ADC (Analog to Digital Conversion) or DAC (Digital to Analog Conversion) to access a digital signal to an analog phone; a voice DSP (Digital Signal Processor) for storing a procedure for processing the voice signal from the converting unit according to Spec., and operating the signal according to a call service mode which a user intends to use; a digital tone generating unit for storing sources of various tones for phone functions, and guide tones of VoIP (Voice over Internet Protocol), VoDSL (Voice Over Digital Subscriber Line) and VoMBN (Voice Over Multi-service Broadband Networks), generating a tone corresponding to the selected mode, and transmitting the tone to the user through a multiplexer; the multiplexer for outputting data to one of the channels from the digital tone generating unit and the voice DSP; a processor for confirming the selected mode when the user has selected the VoIP, VoDSL, VoMBN or general phone, and outputting information on the confirmed mode to the digital tone generating unit and the voice DSP; a relay switch for receiving an off signal from the processor and interrupting a central office phone line when the user has pressed a specific digit to use the digital network services, and maintaining an on state when the user has pressed a general central office phone digit; an ADSL DSP (Asymmetric Digital Subscriber Line Digital Signal Processor) being linked to an ADSL AFE (Asymmetric Digital Subscriber Line Analog Front End), and having a function of supporting communication during the transition of ADSL data, for removing noise and impulse type noise generated on a line; and the ADSL AFE which is a module for supporting matching of an ADSL line, and enabling bi-directional dual communication of the ADSL data on the line. The voice DSP initially sets up one of the VoIP mode, VoDSL mode and VoMBN mode as a default mode on the basis of the call type which the user frequently uses.

In addition, a method for using a composite voice service terminal apparatus includes: a step for a user to pick up a receiver for hook-on; a step for confirming a pressed digit to decide whether the user intends to make a call through digital networks; a step for performing a general phone call through a general phone line when the user has pressed a general central office phone number, not the digit for the digital networks; a step for interrupting a relay of the general phone line when the user has pressed the digit notifying that he/she intends to make a call through the digital networks, and confirming a digit which the user has pressed to select a wanted service network of the digital networks; a step for loading a VoIP firmware and making a call, when the user has pressed a digit for a VoIP service; a step for loading a VoDSL firmware and making a call, when the user has pressed a digit for a VoDSL service; and a step for loading a VoMBN firmware and making a call, when the user has pressed a digit for a VoMBN service.

The method for using the composite voice service terminal apparatus further includes a step for outputting a VoIP tone from a digital tone generating unit to a corresponding user side channel through a multiplexer so that user can confirm a service procedure, when the user has pressed the digit for the VoIP service.

The method for using the composite voice service terminal apparatus further includes a step for outputting a VoDSL tone from the digital tone generating unit to a corresponding user side channel through the multiplexer so that user can confirm a service procedure, when the user has pressed the digit for the VoDSL service.

The method for using the composite voice service terminal apparatus further includes a step for outputting a VoMBN tone from the digital tone generating unit to a corresponding user side channel through the multiplexer so that user can confirm a service procedure, when the user has pressed the digit for the VoMBN service.

The method for using the composite voice service terminal apparatus further includes a step for setting up a voice DSP and a processor in a corresponding mode and restarting them, when the user has pressed the digits for the VoDSL service and the VoMBN service.

In accordance with the principles of the present invention, as embodied and broadly described, the present invention provides an apparatus, comprising: a converting unit receiving a voice signal and performing at least one selected from among analog to digital conversion and digital to analog conversion on the voice signal; a first processor receiving the voice signal from said converting unit, storing a plurality of procedures, the procedures conforming to predetermined standards of a plurality of voice communication modes, the plurality of voice communication modes including a selected mode, said first processor performing the stored procedure corresponding to the selected mode to cause the voice signal to comply with the predetermined standard corresponding to the selected mode, the selected mode being a mode selected from at least a voice over Internet protocol mode, a voice over digital subscriber line mode, and a voice over multi-service broadband networks mode; a digital tone generating unit storing a plurality of sources of tones for phone functions, storing tones corresponding to the plurality of voice communication modes, generating at least one tone corresponding to the selected mode; a multiplexer receiving and multiplexing the at least one tone from said digital tone generating unit and the processed voice signal from said first processor, and outputting the multiplexed signal to said converting unit; a second processor confirming the selected mode and outputting information identifying the confirmed selected mode to said digital tone generating unit and to said first processor; a relay switch receiving an off signal from said second processor and interrupting a central office phone line when a predetermined code is selected, the predetermined code corresponding to the voice communication modes including digital network services, and maintaining an on state when a general central office phone digit is selected; a third processor being in communication with said second processor, supporting communication during transmission of asymmetric digital subscriber line data, said third processor removing generated noise; and an analog front end being in communication with said third processor, supporting matching of an asymmetric digital subscriber line, and enabling bi-directional dual communication of the asymmetric digital subscriber line data.

In accordance with the principles of the present invention, as embodied and broadly described, the present invention provides a method, comprising: performing an operation for hook-on; detecting at least a first selected digit; when the first selected digit corresponds to a general central office phone number, performing a general telephone call through a general telephone line; when the first selected digit corresponds to a predetermined code, switching a relay on the general phone line, the predetermined code corresponding to digital network services; when said switching is performed, detecting a second selected digit selected after the first selected digit, the second selected digit corresponding to selected digital network services selected from among a plurality of digital network services, the plurality of digital network services including at least a voice over Internet protocol service, a voice over digital subscriber line service, and a voice over multi-service broadband networks service; when the second selected digit corresponds to the voice over Internet protocol service, loading voice over Internet protocol firmware and making a voice over Internet protocol call; when the second selected digit corresponds to the voice over digital subscriber line service, loading voice over digital subscriber line firmware and making a voice over digital subscriber line call; and when the second selected digit corresponds to the voice over multi-service broadband networks service, loading voice over multi-service broadband networks firmware and making a voice over multi-service broadband networks call.

In accordance with the principles of the present invention, as embodied and broadly described, the present invention provides an apparatus, comprising: a converting unit receiving a voice signal and performing at least one selected from among analog to digital conversion and digital to analog conversion on the voice signal; a first processor receiving a voice signal from said converting unit when digital network services are selected, said first processor storing a plurality of procedures according to predetermined standards of a plurality of voice communication modes, the plurality of voice communication modes including a selected mode, said first processor performing the stored procedure corresponding to the selected mode causing the voice signal to comply with the predetermined standard corresponding to the selected mode when the digital network services are selected; a digital tone generating unit generating at least one tone corresponding to the selected mode and outputting the at least one tone to said converting unit; a second processor confirming the selected mode and outputting information identifying the confirmed selected mode to said digital tone generating unit and to said first processor; a relay switch receiving an off signal from said second processor and interrupting a central office phone line when a predetermined code is selected, the predetermined code corresponding to the voice communication modes including digital network services, and maintaining an on state when a general central office phone digit is selected; a third processor being in communication with said second processor, supporting communication during transmission of asymmetric digital subscriber line data, said third processor removing generated noise; and an analog front end being in communication with said third processor, supporting matching of an asymmetric digital subscriber line, and enabling bi-directional dual communication of the asymmetric digital subscriber line data.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

In order to provide the internet phone at a low price, the voice over Internet protocol (VoIP) could be utilized. The VoIP which connects a general phone to an IP network embodies a call service through the existing Internet protocol (IP) network, so that the users can receive long-distance and international call services in an internet or intranet environment with local call charges. Although reducing call charges, the VoIP shows low call quality and requires a VoIP only terminal.

So as to solve the foregoing problems, the voice over digital subscriber line (VoDSL) which improves call quality and reduces call charges can be suggested. The VoDSL which connects a general phone to an digital subscriber line (xDSL) network physically transmits voice to a DSL physical layer protocol through a pair of copper lines. The VoDSL also provides a packet type solution such as voice over asynchronous transfer mode (VoATM) and VoIP over DSL, and requires a VoDSL only terminal.

Attempts can be made to standardize the voice over multi-service broadband networks (VoMBN) for providing a voice call service by accessing a general phone and an IP/ATM/exchange. It may be expected to improve call quality and reduce call charges. The VoMBN also requires a VoMBN only terminal.

Figure 1:
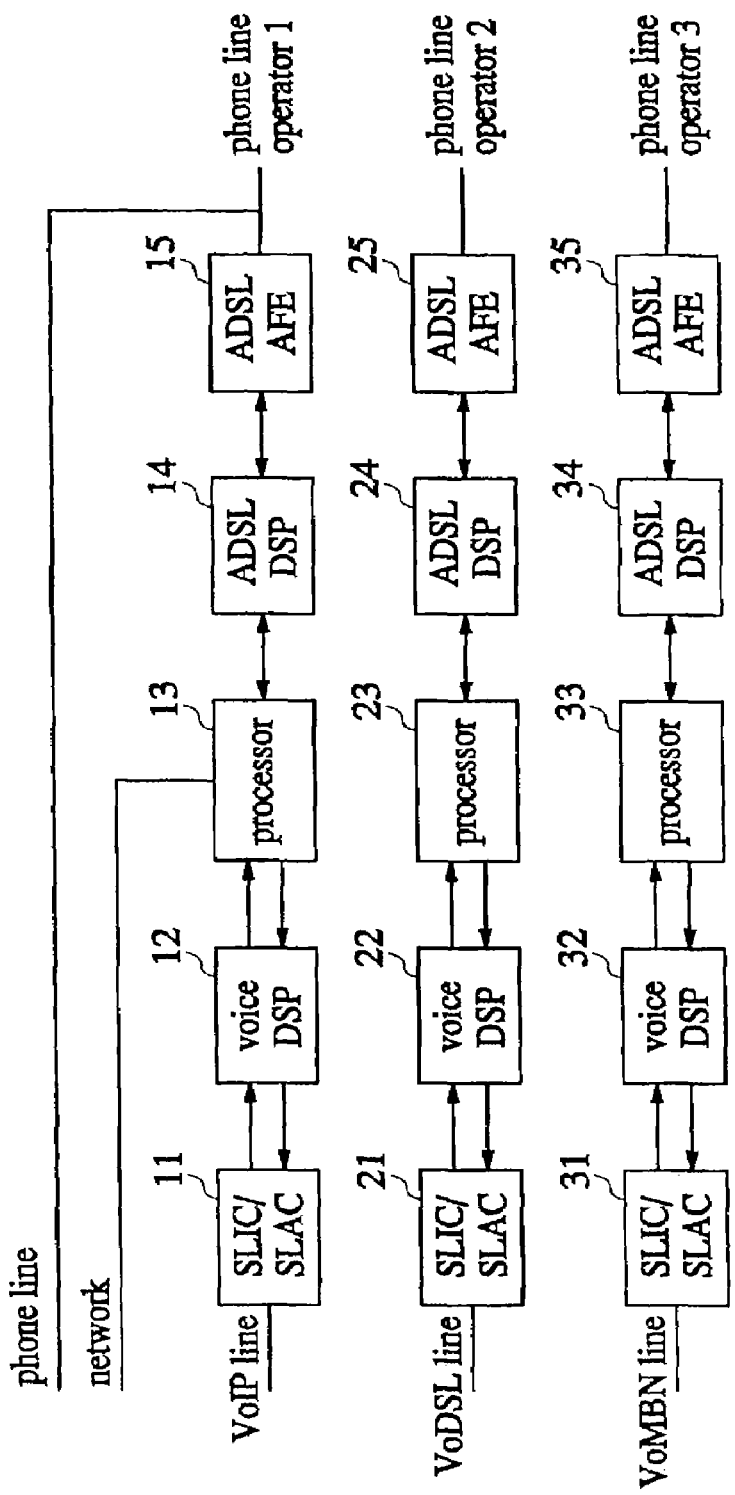
FIG. 1 is a schematic diagram illustrating a voice service network using an Internet.

The structure of terminal apparatuses for embodying the aforementioned voice service techniques will now be explained with reference to the accompanying drawings. FIG. 1 is a schematic diagram illustrating a voice service network using an Internet. Referring to FIG. 1, the terminal apparatus for performing the VoIP service through the most generalized ADSL (Asymmetric Digital Subscriber Line) data service includes a SLIC/SLAC (Subscriber Line Interface Circuit/Subscriber Line Audio processing Circuit) 11, a voice DSP (Digital Signal Processor) 12, a processor 13, an ADSL DSP 14, and an ADSL AFE (Analog Front End) 15.

The terminal apparatus for performing the VoDSL service through the ADSL data service is also composed of a SLIC/SLAC 21, a voice DSP 22, a processor 23, an ADSL DSP 24 and an ADSL AFE 25. In addition, the terminal apparatus for performing the VoMBN service through the ADSL data service includes a SLIC/SLAC 31, a voice DSP 32, a processor 33, an ADSL DSP 34 and an ADSL AFE 35.

The SLIC/SLAC 11, 21, and 31 execute ADC (Analog to Digital Conversion) or DAC (Digital to Analog Conversion) to access digital signals to an analog phone. The voice DSP 12, 22, and 32 respectively perform a voice processing procedure for satisfying VoIP, VoDSL and VoMBN service standards.

The processors 13, 23, and 33 perform the whole control operation, and control a process for transmitting voice signals to networks. The ADSL DSP 14, 24, and 34 are linked to the ADSL AFE 15, 25, and 35, and include a function of supporting dual communication of ADSL data for removing noise and impulse type noise generated on a line.

The ADSL AFE 15, 25, and 35, which are modules for supporting matching of the ADSL line, enable bi-directional dual communication of the ADSL data on the line. The above-described voice services have advantages and disadvantages on call purposes as shown in following Table 1.

TABLE 1

| Type | Advantages | Disadvantages |
|---|---|---|
| General Phone | High quality call | Charges of long-distance or international calls |
| VoIP | Low charges of long-distance or international calls regardless of time | Low quality call<br>Not a high quality call |
| VoDSL | Connecting plural phones through one line | Medium quality call<br>Not a high quality call |
| VoMBN | Being standardized, potentially improved call quality, potentially reduced call charges | Not yet standardized |

In consideration of the advantages and disadvantages of the services, the user selects the terminal suitable for his/her call purpose and attempts a call. Here, the user must purchase all terminals for each network, which increases expenses.

Figure 2:
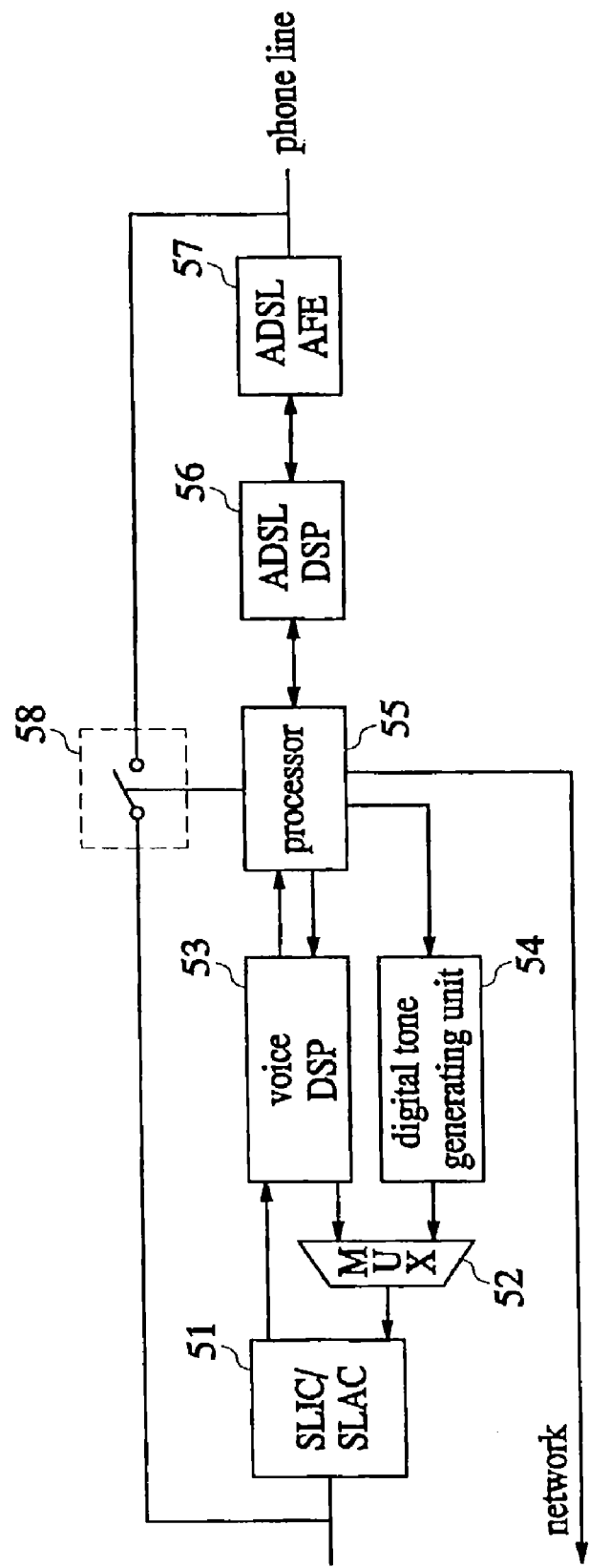
FIG. 2 is a block diagram illustrating an embodiment of a composite voice service terminal apparatus, in accordance with the principles of the present invention.
Figure 3:
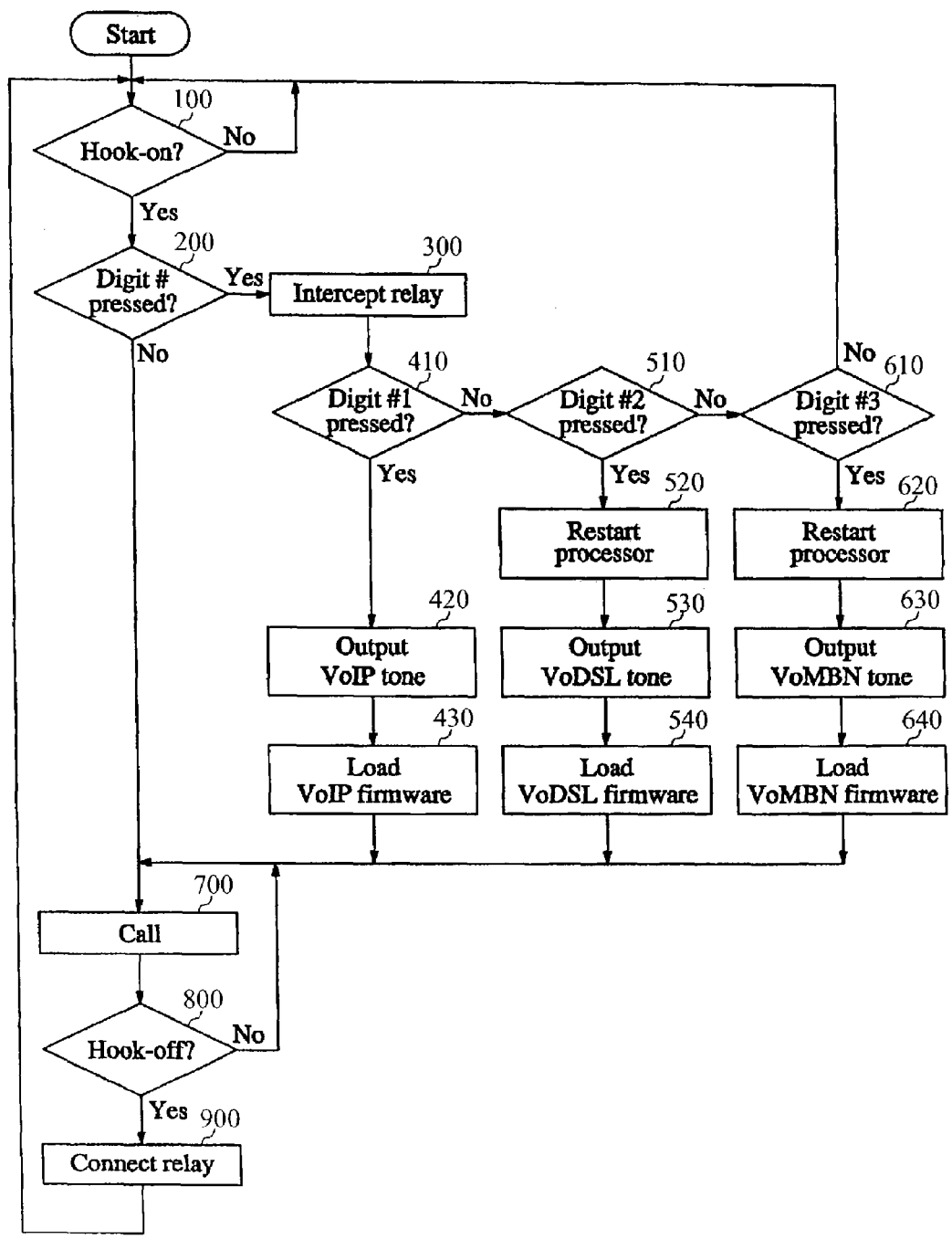
FIG. 3 is a flowchart showing a method for using an embodiment of the composite voice service terminal apparatus, in accordance with the principles of the present invention.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail FIG. 2 is a block diagram illustrating an embodiment of a composite voice service terminal apparatus, in accordance with the principles of the present invention. FIG. 3 is a flowchart showing a method for using an embodiment of the composite voice service terminal apparatus, in accordance with the principles of the present invention. As illustrated in FIG. 2, the composite voice service terminal apparatus includes a SLIC/SLAC 51, a multiplexer (MUX) 52, a voice digital signal processor (DSP) 53, a digital tone generating unit 54, a processor 55, an asymmetric digital subscriber line digital signal processor (ADSL DSP) 56, an asymmetric digital subscriber line analog front end (ADSL AFE) 57, and a relay switch 58.

The voice digital signal processor 53 can also be referred to as the first processor 53. The processor 55 can also be referred to as the second processor 55. The asymmetric digital subscriber line digital signal processor (ADSL DSP) 56 can also be referred to as the third processor 56. The asymmetric digital subscriber line analog front end (ADSL AFE) 57 can also be referred to as the analog front end 57.

The SLIC/SLAC 51, the voice DSP 53, the processor 55, the ADSL DSP 56 and the ADSL AFE 57 have the same functions as the components having the same names shown in FIG. 1., and thus detailed explanations thereof do not need to be repeated here. The voice DSP 53 and the ADSL DSP 56 perform a voice processing procedure for satisfying the VoIP, VoDSL and VoMBN standards.

With reference to FIGS. 2 and 3, newly-added elements will now be explained, in accordance with the principles of the present invention. The digital tone generating unit 54 includes sources of a dial tone, a ring back tone, a busy tone, and guide tones of VoIP, VoDSL and VoMBN, generates a tone corresponding to a selected mode, and transmits the tone to the SLIC/SLAC 51 through the MUX 52.

The MUX 52 outputs data to one of the channels from the digital tone generating unit 54 and the voice DSP 53. The relay switch 58 maintains an on state so that a user can use a general phone, and receives an off signal from the processor 55 and interrupts a relay when the user has pressed a specific digit for digital network services.

The operation of the composite voice service terminal apparatus in accordance with the present invention will now be explained with reference to FIG. 3. When power is applied to the composite voice service terminal apparatus of the present invention, a phone line accesses a central office phone line provided by a telephone office, and the voice DSP 53 is operated in a VoIP mode.

General Phone Call

At step 100, when the user or subscriber intends to make a call through a general phone, and the user picks up a receiver for hook-on, then the relay switch 58 maintains an on state. The hook-on can be accomplished in other ways. That is, any one of several different operations can be performed to arrive at a hook-on condition. One operation that can be performed for hook-on, or to get a hook-on condition, is to lift a telephone receiver. Another operation that can be performed for hook-on, or to get a hook-on condition, is to press a button on a telephone for a speaker-phone function. Another operation that can be performed for hook-on, or to get a hook-on condition, is to press a button on a head set. Another operation that can be performed for hook-on, or to get a hook-on condition, is to connect a headset to a telephone. Thus, many different, operations can be performed which result in a hook-on condition.

At step 200, the user makes the general telephone call by pressing a general central office phone number without pressing digit "#". A general telephone call corresponds to a telephone call not requiring digital network services such as VoIP, VoDSL, or VoMBN, for example.

At step 700, the general telephone call is performed. At step 800, after the user finishes the call, the user puts the receiver in a hook-off state to end the call. At step 900, the relay switch 58 is connected to constantly maintain the on state.

Voice over Internet Protocol Call

At step 100, when the user or subscriber intends to make a call through a VoIP service, and the user picks up the receiver for hook-on, the phone line is temporarily activated. At step 200, since the user wants digital network services, the user presses "#" followed by a predetermined number. At step 300, the relay switch 58 intercepts the line directly after the user presses "#".

The digit "#" is associated with the bottom right key on a standard 12 key telephone keypad. The digit "#" can also be referred to as the "#" key or as the tone corresponding to the "#" key. The digit "#" can also be referred to a predetermined code. When a user presses the "#" key, that means that the predetermined code has been selected. Also, when a user presses the "#" key, this means that "digital network services" has been selected. The digital network services can include at least voice over Internet protocol, voice over digital subscriber line, and voice over multi-service broadband networks. If digital network services are not selected, then a general telephone call will be understood to be selected. In other words, when a user presses a general central office phone digit instead of pressing the "#" key, then a general telephone call will be selected. A general central office phone digit can be any key selected from among 0 to 9 on the standard key telephone keypad, for example. If a user presses "#1" then the user has selected to have a voice over Internet protocol call. On the contrary, if a user presses 1 555 1212 then the user has selected to have a general telephone call, since the numbers 1 555 1212 are general central office phone digits.

At step 410, when the number pressed after "#" is "1", it is confirmed that the user intends to make a call through the VoIP service. At step 420, the digital tone generating unit 54 outputs the VoIP tone to the user through the SLIC/SLAC 51. At step 430, VoIP firmware is loaded. At step 700, the voice DSP 53 is operated in the VoIP mode to perform the call.

At step 800, after the user finishes the call, the user puts the receiver in the hook-off state to end the call. At step 900, the processor 55 outputs an on signal to the relay switch 58 to enter into a general phone access mode, and the relay switch 58 is connected to constantly maintain the on state.

Since the current mode of the voice DSP 53 has been setup in the VoIP mode by default, the processor 55 can directly activate VoIP access to perform the call. The current mode can be set up in a VoDSL mode or VoMBN mode by the user. Preferably, the most frequently-used mode of the user is initially set up.

Voice over Digital Subscriber Line Call

At step 100, when the user or subscriber intends to make a call through a VoDSL service and the user picks up the receiver for hook-on, the phone line is temporarily activated. At step 200, the user presses "#" followed by a previously-set digit. At step 300, the relay switch 58 interrupts directly after the user presses "##". At step 510, since the digit pressed after "#" is "2", it is confirmed that the user intends to make a call through the VoDSL service. At step 520, the voice DSP 53 is reset in the VoDSL mode and the processor 55 is restarted. Here, the call can be held for the restart time by generating a tone.

At step 530, the digital tone generating unit 54 outputs the VoDSL tone to the user through the SLIC/SLAC 51. At step 540, VoDSL firmware is loaded. At step 700, the voice DSP 53 is operated in the VoDSL mode to perform the call. At step 800, after the user finishes the call, the user puts the receiver in the hook-off state to end the call. At step 900, the processor 55 outputs an on signal to the relay switch 58 to enter into a general phone access mode, and the relay switch 58 is connected to constantly maintain the on state.

Voice Over Multi-Service Broadband Networks Call

At step 100, when the user intends to make a call through a VoMBN service and the user picks up the receiver for hook-on, the phone line is temporarily activated. At Step 200, the user presses "#" and a previously-set number such as "3". At step 300, the relay switch 58 is interrupted directly after the user presses "#". At step 610, since the digit pressed after "#" is "3", it is confirmed that the user intends to make a call through the VoMBN service. At step 620, the voice DSP 53 is reset in the VoMBN mode and the processor 55 is restarted.

At step 630, the digital tone generating unit 54 outputs the VoMBN tone to the user through the SLIC/SLAC 51. At step 640, VoMBN firmware is loaded. At step 700, the voice DSP 53 is operated in the VoMBN mode to perform the call. At step 800, after the user finishes the call, the user puts the receiver in the hook-off state to end the call. At step 900, the processor 55 outputs an on signal to the relay switch 58 to enter into a general phone access mode, and the relay switch 58 is connected to constantly maintain the on state.

As described above, the user uses the general phone service for local calls, the VoIP service for long-distance or international calls, and the VoDSL service for high call quality and low charges. Moreover, the user will be able to use the VoMBN service for appropriate call quality and charges.

As discussed earlier, in accordance with the present invention, the composite voice service terminal apparatus enables the user to conveniently and efficiently compare, and selectively use, the composite voice services by call charges and quality. As a result, the user can easily make a phone call and use all the services including general phone, VoIP, VoDSL, and VoMBN, with one terminal at a lower price.

The foregoing paragraphs describe the details of the present invention as it relates to a voice service using a digital network, and, more particularly, to a composite voice service terminal apparatus which allows a user to use a voice call with a wanted service function by mounting various service functions such as general phone, VoIP (Voice Over Internet protocol), VoDSL (Voice Over Digital Subscriber Line) and VoMBN (Voice Over Multi-service Broadband Networks) on one terminal, and a method for using the same.

The present invention is not limited to the following three digital network services: VoIP, VoDSL, and VoMBN. The terminal apparatus shown in FIG. 2 can be modified to be able to handle other types of digital network services other than VoIP, VoDSL, and VoMBN.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. An apparatus, comprising:
a converting unit receiving a voice signal and performing at least one selected from among analog to digital conversion and digital to analog conversion on the voice signal;
a first processor receiving the voice signal from said converting unit, storing a plurality of procedures, the procedures conforming to predetermined standards of a plurality of voice communication modes, the plurality of voice communication modes including a selected mode, said first processor performing the stored procedure corresponding to the selected mode to cause the voice signal to comply with the predetermined standard corresponding to the selected mode, the selected mode being a mode selected from at least a voice over Internet protocol mode, a voice over digital subscriber line mode, and a voice, over multi-service broadband networks mode;
a digital tone generating unit storing a plurality of sources of tones for phone functions, storing tones corresponding to the plurality of voice communication modes, generating at least one tone corresponding to the selected mode;
a multiplexer receiving and multiplexing the at least one tone from said digital tone generating unit and the processed voice signal from said first processor, and outputting the multiplexed signal to said converting unit;
a second processor confirming the selected mode and outputting information identifying the confirmed selected mode to said digital tone generating unit and to said first processor;
a relay switch receiving an off signal from said second processor and interrupting a central office phone line when a predetermined code is selected, the predetermined code corresponding to the voice communication modes including digital network services, and maintaining an on state when a general central office phone digit is selected;
a third processor being in communication with said second processor, supporting communication during transmission of asymmetric digital subscriber line data, said third processor removing generated noise; and
an analog front end being in communication with said third processor, supporting matching of an asymmetric digital subscriber line, and enabling bi-directional dual communication of the asymmetric digital subscriber line data.

2. The apparatus of claim 1, with said first processor setting a default mode to be one mode from among the plurality of voice communication modes.

3. The apparatus of claim 2, with the default mode being determined in dependence upon a call type most commonly used.

4. The apparatus of claim 1, said first processor corresponding to a voice digital signal processor, said third processor corresponding to an asymmetric digital subscriber line digital signal processor, the apparatus corresponding to a composite voice service terminal.

5. A method, comprising:
performing an operation for hook-on;
detecting at least a first selected digit;
when the first selected digit corresponds to a general central office phone number, performing a general telephone call through a general telephone line;
when the first selected digit corresponds to a predetermined code, switching a relay on the general phone line, the predetermined code corresponding to digital network services;
when said switching is performed, detecting a second selected digit selected after the first selected digit, the second selected digit corresponding to selected digital network services selected from among a plurality of digital network services, the plurality of digital network services including at least a voice over Internet protocol service, a voice over digital subscriber line service, and a voice over multi-service broadband networks service;

when the second selected digit corresponds to the voice over Internet protocol service, loading voice over Internet protocol firmware and making a voice over Internet protocol call;

when the second selected digit corresponds to the voice over digital subscriber line service, loading voice over digital subscriber line firmware and making a voice over digital subscriber line call; and when the second selected digit corresponds to the voice over multi-service broadband networks service, loading voice over multi-service broadband networks firmware and making a voice over multi-service broadband networks call.

6. The method of claim 5, further comprising:
when the second selected digit corresponds to the voice over Internet protocol service, outputting a voice over Internet protocol tone from a digital tone generating unit to a corresponding user side channel through a multiplexer, said outputting confirming the selected digital network services.

7. The method of claim 5, further comprising:
when the second selected digit corresponds to the voice over digital subscriber line service, outputting a voice over digital subscriber line tone from a digital tone generating unit to a corresponding user side channel through a multiplexer, said outputting confirming the selected digital network services.

8. The method of claim 5, further comprising:
when the second selected digit corresponds to the voice over multi-service broadband networks service, outputting a voice over multi-service broadband networks tone from a digital tone generating unit to a corresponding user side channel through a multiplexer, said outputting confirming the selected digital network services.

9. The method of claim 5, further comprising:
when the second selected digit corresponds to the voice over Internet protocol service, setting a voice digital signal processor and a second processor to a voice over Internet protocol mode and restarting the voice digital signal processor and the second processor.

10. The method of claim 5, further comprising:
when the second selected digit corresponds to the voice over digital subscriber line service, setting a voice digital signal processor and a second processor to a voice over digital subscriber line mode and restarting the voice digital signal processor and the second processor.

11. The method of claim 5, further comprising:
when the second selected digit corresponds to the voice over multi-service broadband networks service, setting a voice digital signal processor and a second processor to a voice over multi-service broadband networks mode and restarting the voice digital signal processor and the second processor.

12. An apparatus, comprising:
a converting unit receiving a voice signal and performing at least one selected from among analog to digital conversion and digital to analog conversion on the voice signal;
a first processor receiving a voice signal from said converting unit when digital network services are selected, said first processor storing a plurality of procedures according to predetermined standards of a plurality of voice communication modes, the plurality of voice communication modes including a selected mode, said first processor performing the stored procedure corresponding to the selected mode causing the voice signal to comply with the predetermined standard corresponding to the selected mode when the digital network services are selected;
a digital tone generating unit generating at least one tone corresponding to the selected mode and outputting the at least one tone to said converting unit;
a second processor confirming the selected mode and outputting information identifying the confinned selected mode to said digital tone generating unit and to said first processor,
a relay receiving an off signal from said second processor and turning off to interrupt a central office phone line when a predetermined code is selected, the predetermined code corresponding to the voice communication modes including digital network services, and maintaining an on state when at least one general central office phone digit is selected, the predetermined code being distinguishable from the at least one general central office phone digit;
a third processor being in communication with said second processor, supporting communication during transmission of asynunetric digital subscriber line data, said third processor removing generated noise; and
an analog front end being in communication with said third processor, supporting matching of an asymmetric digital subscriber line, and enabling bi-directional dual communication of the asymmetric digital subscriber line data.

13. The apparatus of claim 12, further comprising:
a multiplexer receiving and multiplexing the at least one tone from said digital tone generating unit and the processed voice signal from said first processor, the selected mode being a mode selected from a voice over Internet protocol mode, a voice over digital subscriber line mode, a voice over multi-service broadband networks mode.

14. The apparatus of claim 12, with said first processor setting a default mode to be one mode from among the plurality of voice communication modes.

15. The apparatus of claim 14, with the default mode being determined in dependence upon a call type most commonly used.

16. The apparatus of claim 12, said first processor corresponding to a voice digital signal processor, said third processor corresponding to an asyinmeiric digital subscriber line digital signal processor, the apparatus corresponding to a composite voice service terminal.

17. An apparatus for communication in a public switched telephone network mode, a voice over Internet protocol mode, a voice over digital subscriber line mode, and a voice over multi-service broadband networks mode, comprising:
a converting unit receiving a voice signal and performing at least one selected from among analog to digital conversion and digital to analog conversion on the voice signal;
a first processor receiving the voice signal from said converting unit, storing a plurality of procedures, the procedures conforming to predetermined standards of a plurality of voice communication modes, the plurality of voice communication modes including a selected mode, said first processor perfonning the stored procedure corresponding to the selected mode to cause the voice signal to comply with the predetermined standard corresponding to the selected mode, the selected mode being a mode selected from at least a voice over Internet protocol mode, a voice over digital subscriber line mode, and a voice over multi-service broadband networks mode;
a digital tone generating unit storing a plurality of sources of tones for phone functions, storing tones corresponding to the plurality of voice communication modes, generating at least one tone corresponding to the selected mode;

a multiplexer receiving and multiplexing the at least one tone from said digital tone generating unit and the processed voice signal from said first processor, and outputting the multiplexed signal to said converting unit;

a second processor confirming the selected mode and outputting information identifying the confirmed selected mode to said digital tone generating unit and to said first processor;

a relay switch receiving an off signal from said second processor and interrupting a central office phone line when a predetermined code is selected, the predetennined code corresponding to the voice communication modes including digital network services, and maintaining an on state when a general central office phone digit is selected;

a third processor being in communication wit said second processor, supporting communication during transmission of asymmetric digital subscriber line data, said third processor removing generated noise; and an analog front end being in communication with said third processor, supporting matching of an asymmetric digital subscriber line, and enabling bi-directional dual communication of the asymmetric digital subscriber line data, wherein said apparatus is able to communicate with all of the public switched telephone network mode, the voice over Internet protocol mode, the voice over digital subscriber line mode and the voice over multi-service broadband networks mode.

\* \* \* \* \*